(12) United States Patent
Miyagawa et al.

(10) Patent No.: US 10,794,811 B2
(45) Date of Patent: Oct. 6, 2020

(54) PARTICULATE MATTER DETECTION APPARATUS THAT MITIGATES WATER COLLECTION

(71) Applicant: DENSO CORPORATION, Kariya, Aichi-pref. (JP)

(72) Inventors: Go Miyagawa, Kariya (JP); Masayuki Tamura, Kariya (JP); Masahiro Yamamoto, Kariya (JP); Takashi Araki, Kariya (JP); Toshihiro Sakawa, Kariya (JP); Masato Katsuno, Kariya (JP); Manabu Yoshidome, Kariya (JP)

(73) Assignee: DENSO CORPORATION, Kariya (JP)

( * ) Notice: Subject to any disclaimer, the term of this patent is extended or adjusted under 35 U.S.C. 154(b) by 267 days.

(21) Appl. No.: 15/769,797

(22) PCT Filed: Oct. 20, 2016

(86) PCT No.: PCT/JP2016/081168
§ 371 (c)(1),
(2) Date: Apr. 20, 2018

(87) PCT Pub. No.: WO2017/069215
PCT Pub. Date: Apr. 27, 2017

(65) Prior Publication Data
US 2018/0313739 A1 Nov. 1, 2018

(30) Foreign Application Priority Data

Oct. 21, 2015 (JP) .................................. 2015-207173

(51) Int. Cl.
*G01N 15/06* (2006.01)
*F01N 11/00* (2006.01)
(Continued)

(52) U.S. Cl.
CPC ......... *G01N 15/0656* (2013.01); *F01N 11/00* (2013.01); *F01N 13/008* (2013.01);
(Continued)

(58) Field of Classification Search
CPC . G01N 15/0606; F01N 2560/05; F01N 11/00; F01N 2560/20; F01N 3/023; F01N 15/0656; F01N 13/008; F01N 2550/04
See application file for complete search history.

(56) References Cited

U.S. PATENT DOCUMENTS

2011/0314796 A1 12/2011 Nakamura et al.
2012/0260636 A1* 10/2012 Hashida ............... F01N 11/00
60/276
(Continued)

*Primary Examiner* — Eric S. McCall
*Assistant Examiner* — Timothy P Graves
(74) *Attorney, Agent, or Firm* — Nixon & Vanderhye P.C.

(57) ABSTRACT

An apparatus which detects particulate matter is provided. This apparatus estimates a volume of water inside an exhaust passage using estimation sections. When an estimated volume of water is larger than a water drainage threshold, an element portion is heated using a heater by the first temperature range controller, in a temperature range which resists water-induced cracking independent of a volume of water droplets. If the estimated volume of water is less than a water drainage threshold, the water drainage determination section determines that the water drainage of the exhaust passage is completed. Additionally, if it is estimated that the water drainage is completed, the element portion is heated by a second temperature controller at temperature lower than a starting temperature of combustion of particulate matter and in order to repel water adhered onto the element portion in a water-repellent temperature range for a predetermined period.

21 Claims, 8 Drawing Sheets

(51) Int. Cl.
*F01N 3/023* (2006.01)
*F01N 13/00* (2010.01)

(52) U.S. Cl.
CPC .......... *G01N 15/0606* (2013.01); *F01N 3/023* (2013.01); *F01N 2550/04* (2013.01); *F01N 2560/05* (2013.01); *F01N 2560/20* (2013.01)

(56) References Cited

U.S. PATENT DOCUMENTS

2013/0256296 A1    10/2013  Hocken et al.
2015/0076134 A1*    3/2015  Surnilla ............. G01N 15/0656
                                                         219/221
2017/0122179 A1     5/2017  Miyagawa et al.

* cited by examiner

PARTICULATE MATTER DETECTION APPARATUS THAT MITIGATES WATER COLLECTION

CROSS-REFERENCE RELATED APPLICATION

This application is the U.S. national phase of International Application No. PCT/JP2016/081168 filed on Oct. 20, 2016 which designated the U.S. and claims benefit of priority of earlier Japanese Patent Application No. 2015-207173 filed on Oct. 21, 2015, the entire contents of each of which are hereby incorporated by reference.

BACKGROUND

Technical Field

The present disclosure relates to a particulate matter detection apparatus which detects particulate matter, and more particularly relates to a particulate matter detection apparatus which detects a quantity of particulate matter contained in an exhaust gas of an internal combustion engine.

Background Art

Conventionally, an apparatus equipped with a particulate matter sensor is known. This apparatus detects particulate matter (referred to as PM hereafter) contained in an exhaust gas of a diesel engine. There is a known apparatus which is provided with the foregoing configuration. In this known apparatus an element portion of the particulate matter sensor is controlled to be in a predetermined temperature range for combustion of PM, after the particulate matter is detected, and PM which has accumulated on the element portion is removed by combustion. Operation of an engine which adopts this kind of apparatus may be stopped before the PM is combusted. In this case, a state of the PM which remains accumulated on the element portion will change during a period in which the engine is stopped and when the engine is re-started due to an environmental change. However, if the detection of PM is continued from a previous state before the engine was stopped, there is a concern that detection errors will increase.

A particulate matter detection sensor disclosed in JP literature 1 performs combustion control to remove PM accumulated on a surface of an element portion by combustion, at a start-up period of an engine. However, if an element portion is covered with water droplets from water in an exhaust pipe or an exhaust gas when the element portion is heated, there is a case of the element portion cracking, for example. The particulate matter detection sensor of JPL1 calculates a danger level of water droplets based on an operating state of the engine, waits until the water has dried so that the danger level of the water droplets is within an acceptable range, and then performs the combustion control.

CITATION LIST

Patent Literature

[Patent Literature 1] JP2012-12960A

Condensed water in exhaust gas may contain pollutants, for example, metal components derived from engine oil and an exhaust pipe, or components of additive agents, for example. A concentration of the pollutants in the condensed water is increased further, by evaporation of water due to an increase of a temperature of the exhaust gas, after an engine starts. If the condensed water containing a high concentration of pollutants adheres to a surface of the element portion, these pollutants will dry and remain on the surface of the sensor portion. Issues of functional deterioration the element portion or loss of function thereof may thus arise as a consequence.

In view of the above issues, the present disclosure aims to provide a particulate matter detection apparatus, which is configured in order to prevent water-induced cracking thereof when the element portion is dried, and decrease contamination of the element portion due to pollutants.

SUMMARY

The present disclosure is a particulate matter detection apparatus provided with an element portion onto which a particulate matter contained in an exhaust of an internal combustion engine is to be adhered to the element portion, a heater which heats the element portion, a detecting portion which detects a quantity of the particulate matter on a basis of electrical features of the sensor portion, and an estimation section which estimates a volume of water in an exhaust passage of the internal combustion engine. There is also provided, a first temperature controller heating the sensor portion using the heater to cause a temperature of the element portion to be within a temperature range using the heater, when the estimated volume of water is larger than a water drainage threshold, the element portion whose temperature is within the temperature range which resists water-induced cracks of the element portion independently of any volume of water droplets covering the element portion, a water drainage determination section which determines completion of water drainage of the exhaust passage when the estimated volume of the water is less than the water drainage threshold, and a second temperature controller configured to, when it is determined that the water drainage is completed, heat the element portion using the heater, such that the temperature of the element portion is maintained within a water-repellent temperature range for a predetermined period, the water repellent temperature range being defined as a lower temperature than a starting temperature of combustion of the particulate matter, which enables water adhered onto the element portion to be repelled using the heater.

According to the present disclosure, if the volume of water in the exhaust passage is determined to be larger than the threshold of the water drainage, the heater heats the element portion, and the element portion is controlled in the temperature range resisting water-induced cracks of the element portion, independently of the any volume of the water droplets covering the element portion. When the volume of water in the exhaust passage is determined to be larger than the threshold of the water drainage, the exhaust passage is in a state of water-invasion and an exhaust gas temperature is relatively low. For this reason, the temperature of the element portion may be provided as a temperature which is higher than or near to the exhaust gas temperature, even when the element portion is heated in the temperature range resisting the water-induced cracks of the element portion independently of the any volume of the water droplets covering the element portion. As a result, thermophoresis of pollutants from the element portion to the exhaust gas occurs or thermophoresis of pollutants to the element portion may be suppressed. Furthermore, the water-induced cracking of the element portion is prevented, and contamination of the element portion due to pollutants is may also be suppressed.

When it is determined that water drainage of the exhaust passage is completed, the temperature of the element portion is lower than a starting temperature of particulate matter combustion. Additionally, the element portion is heated for a predetermined period in the water-repellent temperature range to repel water which is adhered to the element portion by the Leidenfrost effect. After the water drainage of the exhaust passage is completed, the water-induced cracking of the sensor element is prevented even when the temperature of the element portion is increased to the water-repellent temperature range. As a result, since water which has adhered onto the element portion is repelled, pollutants will not adhere onto the element portion, thus the contamination of the element portion due to the pollutants may be suppressed. Furthermore, the water-induced cracking of the element portion is prevented when the element portion is dried, and contamination of the element portion by the pollutants may also be suppressed.

BRIEF DESCRIPTION OF DRAWINGS

In the accompanying drawings.

EMBODIMENTS

Each embodiment of a particulate matter detection apparatus (referred to as PM detection apparatus, hereon) which is adapted to an engine system mounted in a vehicle, will next be described with reference to the figures. It is to be understood that, the same symbol is used in the figures for configuring parts which are the same or equal to each other in each of the embodiments.

First Embodiment

Figure 1:
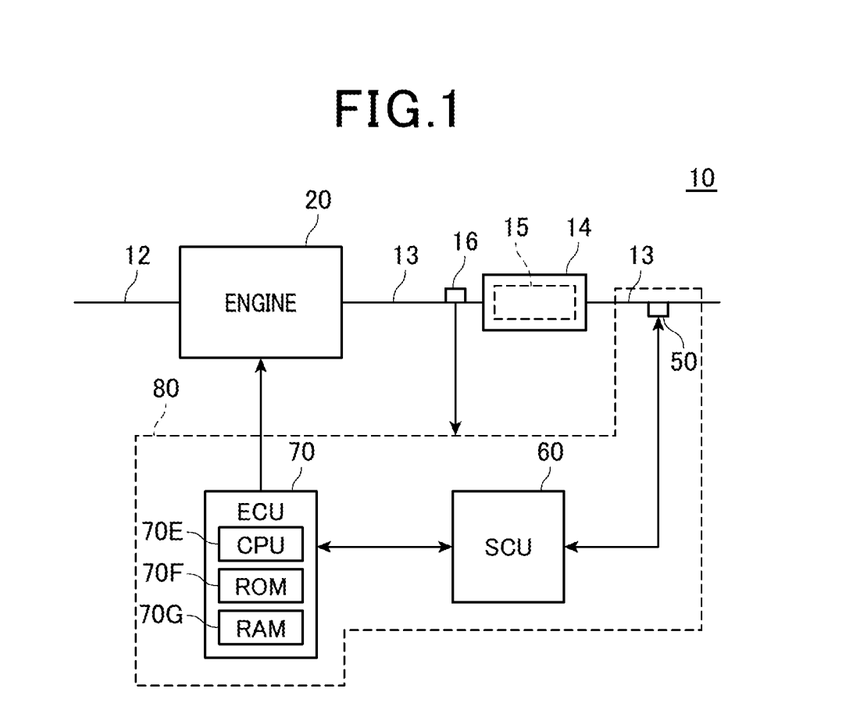
FIG. 1 is a block diagram showing a schematic configuration of an engine system according to each of embodiments.
Figure 2:
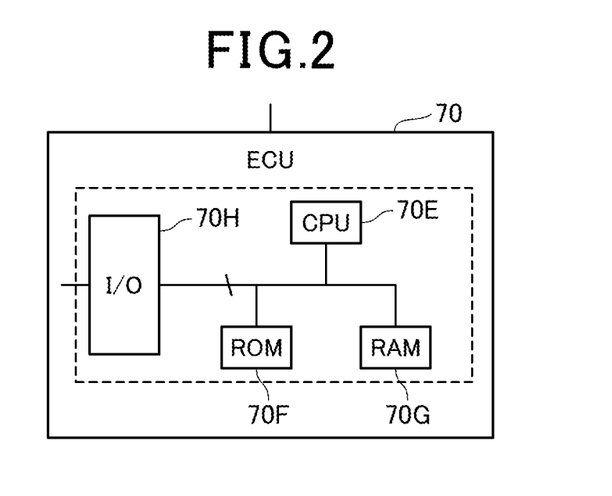
FIG. 2 is a block diagram showing a schematic configuration of an ECU employed for each of the embodiments.

Firstly a configuration of an engine system 10 of a first embodiment is described. As shown in FIG. 1, the engine system 10 is provided with an engine 20. The engine 20 (internal combustion engine) is a diesel engine, for example. The engine 20A is connected to an intake passage 12 and an exhaust passage 13. An exhaust gas purifying device 14 is mounted on the exhaust passage 13. The exhaust gas purifying device 14 is configured to remove toxic components from exhaust gas, which is emitted from the engine 20. The toxic components are PM, for example, nitrogen oxides, and carbon compounds such as HC (hydrocarbons) and CO (Carbon Monoxide), which are generated from fuel that has not burned or from incomplete combustion. Particularly in the present embodiment, a PM capturing filter 15 is provided on the exhaust purification device 14. The exhaust gas purification device 14 is a known configuration, therefore further details are omitted.

The engine system 10 is equipped with a temperature sensor 16 and a PM detection apparatus 80. The temperature sensor 16 is disposed on an upstream-side of the exhaust passage 13, than the exhaust purification device 14, and is configured to monitor an exhaust gas temperature. An ECU (Electrical Control Unit) 70 described hereinafter monitors the exhaust gas purification device 14 and a state of the PM capturing filter 15, based on the exhaust gas temperature. If an amount of captured PM exceeds an allowed capacity, a regeneration control is performed.

The PM detection apparatus 80 is equipped with a PM sensor 50, an SCU60 (System Control Unit), and the ECU70.

Figure 3:
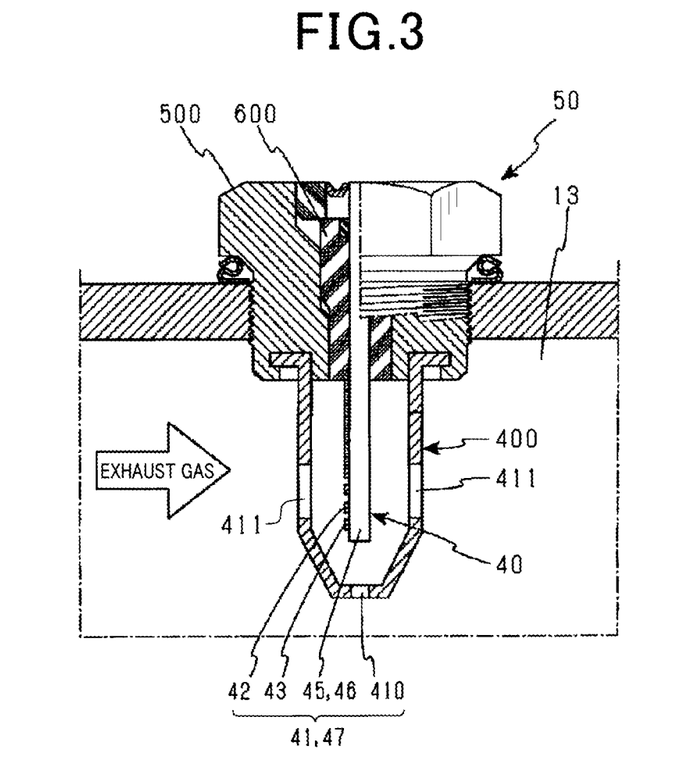
FIG. 3 is a schematic cross sectional view showing a PM sensor mounted on an exhaust passage of an engine.

The PM sensor 50 is disposed on a downstream-side of the exhaust passage 13, than the exhaust gas purification device 14, and is configured to detect PM which slips through the PM capturing filter 15 and passes downstream thereof. Hereafter, a configuration of the PM sensor 50 will be described with reference to FIG. 3 and FIG. 4. The PM sensor 50 is provided with a sensor portion 40, a cover body 400, a cylindrical housing 500, and a cylindrical insulator 600. The cylindrical housing 500 is fixed to a passage wall of the exhaust passage 13. The cylindrical insulator 600 is maintained inside the cylindrical housing 500. The cover body 400 is formed with an empty inside, and is fixed to a lower-end portion of the cylindrical housing 500. The cover body 400 protrudes inside the exhaust passage 13. An upper half section of the sensor portion 40 is inserted into the cylindrical insulator 600 and fixed thereto. A respective lower half of the sensor portion 40 is positioned in the empty section of the cover body 400. Through holes 410 and 411 are provided on a respective bottom section and side section of the cover body 400, such that, the exhaust gas may flow into and out therefrom. The exhaust gas which contains PM is exhaust gas which has passed through the PM capturing filter 15.

Figure 4:
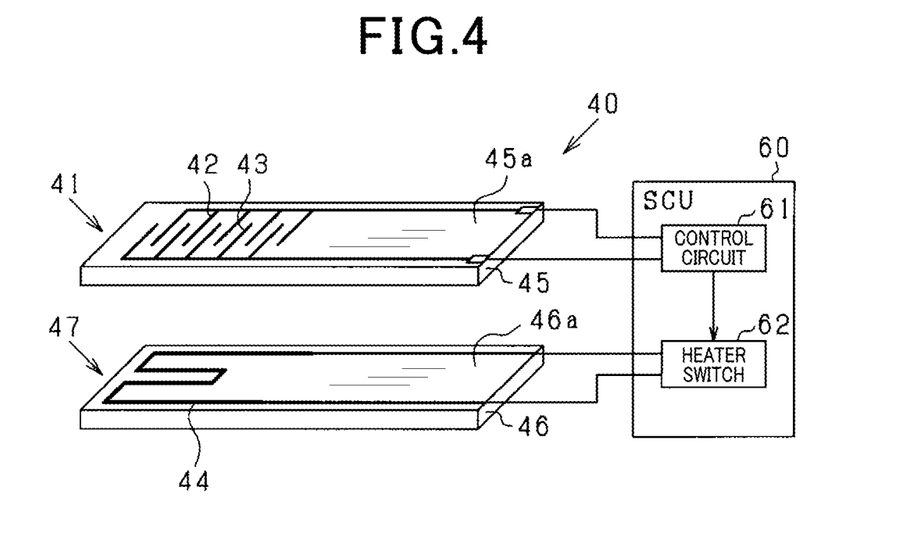
FIG. 4 is a schematic configuration showing an element portion of the PM sensor and a heating section.

The sensor portion 40 of the PM sensor 50 is configured of the element portion 41 and a heating section 47. The element portion 41 is provided with one pair of comb shaped electrodes 42 and 43 formed on top of one surface 45a of an insulation substrate 45. The one pair of the electrodes 42 and 43 are arranged to oppose each other with a predetermined distance therebetween. The one pair of electrodes 42 and 43 are connected to the control circuit 61 of the SCU60. The insulation substrate 45 is formed from electrical insulating materials and ceramic material which have superior thermal resistance, for example, alumina, zirconia, beryllium oxide, mullite and silicon nitride. These materials are formed in a flat plate shape using known methods, for example, doctor blade method and press-forming method. The PM contained in the exhaust gas, which flows into the PM detection apparatus from the through holes 410 and 411, is adhered onto the element portion 41. Since soot, for example, which has conductivity is included in PM, an electrical resistance between the electrodes drops to a predetermined level, when the PM adheres between the electrodes 42 and 43. That is, once PM adheres between the electrodes, electrical properties of the element portion 41 are changed.

The heating section 47 is configured of the heater 44, which is formed on a top of one surface 46a of an insulation substrate 46. The insulation substrate 46 is formed by the same method used for the insulation substrate 45. The heater 44 is connected to a heater switch of the SCU60. The heating section 47 is disposed in a position directly below the electrodes 42 and 43. The heating section 47 efficiently heats the element portion in a predetermined temperature range. It is noted that the insulation substrates 45 and 46 may be unified into one. That is, a configuration in which the heater 44 is in-built in the insulation substrate 45 of the element portion 41, and the sensor portion 40 is configured only from the element portion 41 may also be provided.

Figure 6:
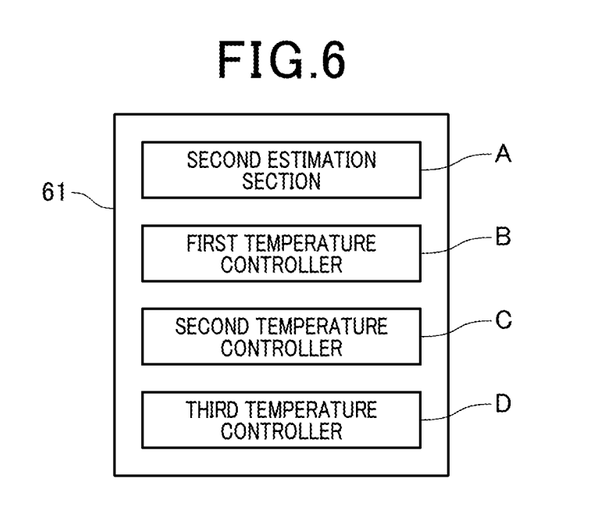
FIG. 6 is a functional block diagram showing a function of a control circuit.

The SCU 60 is equipped with a control circuit 61 and a heater switch 62. The heater switch 62 is a power source which supplies electricity to the heater 44. The control circuit 61 detects electrical resistance between electrodes 42 and 43, and transmits electric signals corresponding to the detected electrical resistance to the ECU 70. The control circuit 61 communicates with the ECU 70, in a proper manner, in order to mutually exchange information. The control circuit 61 controls an operation of the heater switch 62, and controls a temperature of the heater 44. That is, the control circuit 61 controls a temperature of the element portion 41, which is heated by the heater 44. The control circuit 61 actualizes a second estimation section 60A, a first temperature controller 60B, a second temperature controller C, and a third temperature controller D.

Figure 5:
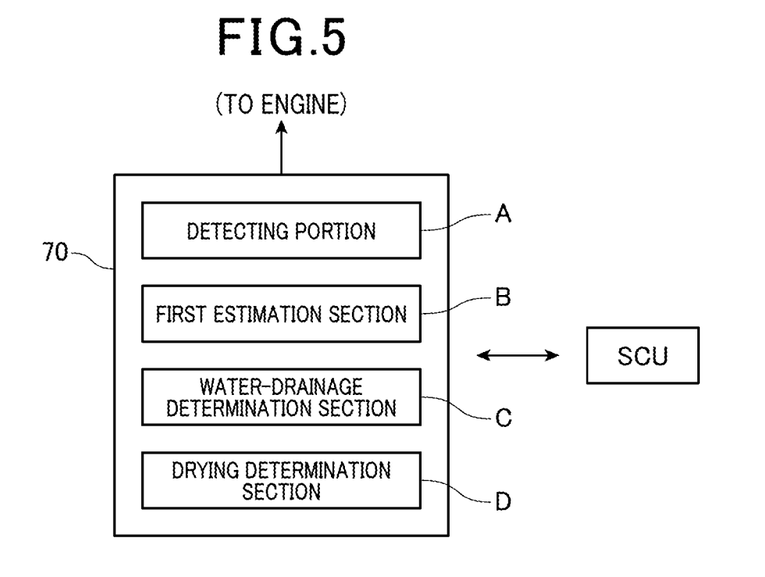
FIG. 5 is a functional block diagram exemplifying a function of the ECU.
Figure 12:
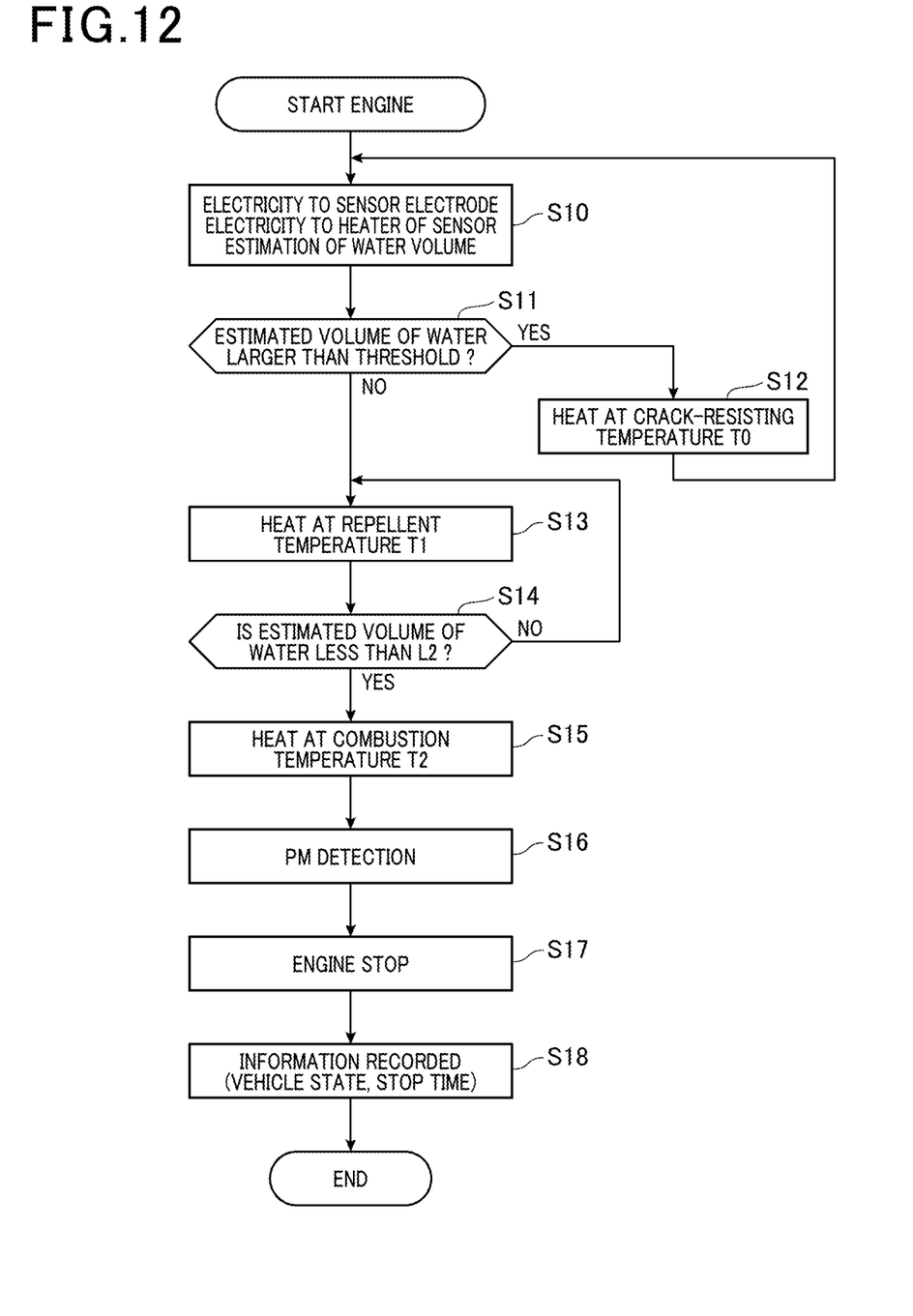
FIG. 12 is a flow chart showing an order of a process for detecting a quantity of PM.

The ECU70 is mainly configured of a CPU70E (central processing unit), a memory, for example, a ROM70F (read only memory), a memory, for example, a RAM70G (random access memory) and microcomputer 701 equipped with I/O:70H, for example. The ROM70F functions as a non-transitory recording medium. As shown in FIG. 5, the ECU70 functionally actualizes a detecting portion 70A, a first estimation section 70B, a water drainage determination section 70C, and a drying determination section D, described hereinafter. The functional block diagram actualizes a function of the CPU70E. That is, the CPU70E reads a program pre-stored in the ROM70F and executes the program according to a procedure which is described in detail herein after. A program, which underlies a process to detect a quantity of PM is included in this program. This process which is shown in FIG. 12 will be described hereinafter. The RAM70G is used for temporary storage of data. The data here refers to data currently executed under the management of the CPU70E. The I/O:70H functions as an interface of an input and output of information between the engine 20 and the SCU60. The detecting portion 70A detects the amount of PM based on the electrical properties of the element portion 41. That is, the detecting portion 70A detects the quantity of PM from electric signals transmitted from the control circuit and a map, for example, which shows a correspondence between the electric signals and a quantity of PM. The ECU70 executes control of the engine 20 and a regeneration control of the PM capturing filter 15.

Next, a detailed operation of the PM detection apparatus 80 will be described with reference to the figures. If abnormality of PM capturing filter occurs and it becomes difficult to capture PM in the usual manner, the quantity of PM emitted to the downstream side of the PM filter will suddenly increase. The ECU70 is configured to monitor the detected quantity of PM, at which point if the quantity of PM is clearly larger than the usual quantity, the ECU70 determines that the PM capturing filter 15 is abnormal. However, even if the PM capturing filter 15 is normal, once a quantity of PM accumulated on the element portion exceeds a given quantity, resistance between electrodes is decreased and a precision of PM detection will also decrease. Therefore, once the quantity of PM on the element portion has accumulated to a certain level, the accumulated PM is preferably combusted and removed by performing a sensor regeneration control.

Before the sensor regeneration control is executed, there is, however, a situation where operation of the engine 20 is stopped. In this case, when the engine 20 is re-started, a state of the PM which remains on the element portion 41 may change from a state thereof when the engine was stopped. For example, if the engine 20 is stopped when the temperature of the exhaust passage 13 is high, it is then considered that only soluble organic fractions (SOF) of the PM remaining on the element portion 41 will be evaporated. As a result, if the engine 20 is stopped and then re-started in the state where PM remains on the element portion 41, it is considered that an erroneous difference in an output of the PM sensor 50 will occur.

At this point, once the engine 20 is restarted, electricity is supplied to the heater 44, and the element portion 41 is heated to a combustion temperature T2 which is a temperature within a combustion temperature range (for example, from 650° C.) to combust PM. After the PM which remains on the element portion 41 is removed by combustion, it is considered that detection of PM is re-started. The temperature of the element portion 41 is considered to be a temperature of the heater 44, and the temperature of the heater 44 is calculated from a resistance value of the heater 44. Therefore the temperature of the element portion 41 may be acquired by setting the temperature sensor to the element portion 41 and by detection thereof.

Figure 8:
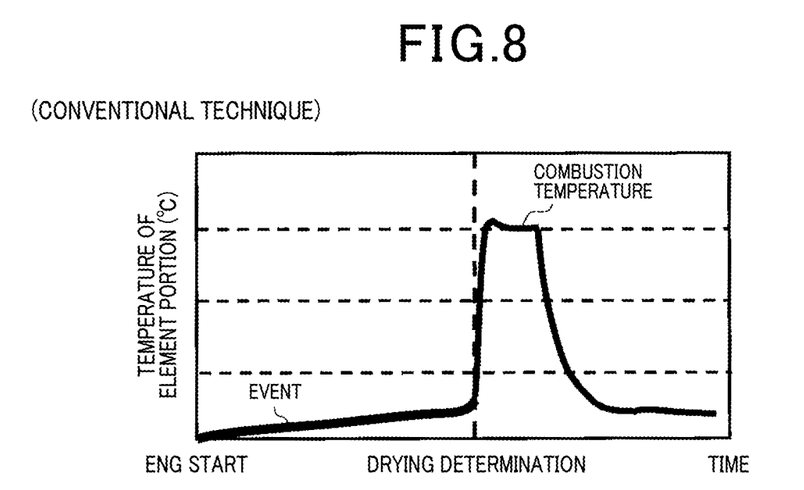
FIG. 8 is a time chart of a conventional element temperature.

Water vapor contained in the exhaust gas is condensed during a period in which the engine 20 is off and at a start-up period of the engine 20, and accumulation of the condensed water frequently occurs in the exhaust passage. Once there is a build-up of the condensed water in the exhaust passage, the condensed water flows from the through holes 410 and 411 into the cover body 400, and the element portion 41 and the heating section 47 are covered with water droplets. If heating in the combustion range of the element portion 41 and the heating section 47 are performed in a state of being covered the water droplets, water-induced cracking of the respective insulation substrate 45 of the element portion 41 and the insulation substrate 46 of the heating section 47 will occur. In order to prevent the water-induced cracking, the elimination of PM by combustion is performed after waiting for the sensor portion 40 to dry. Conventionally, after the engine 20 is started, water is evaporated by an increase in the exhaust temperature, and PM is removed by combustion after the sensor 40 has been dried, as shown in FIG. 8.

However, condensed water may include pollutants, such as, metal components, for example, calcium sulfate and magnesium sulfate. These pollutants are called Ash, which are insulating substances derived from metal components, such as, calcium, which is contained in engine oil, and also from sulfur, which is contained in fuel. Once the condensed water evaporates, a concentration of the pollutants in the condensed water increases. If water evaporates when the element portion 41 is covered with water drops, pollutants are dried and thus remain on the surface 45a, which is configured with the electrodes 42 and 43 of the element portion 41. As a result, the element portion 41 is contaminated. If the element portion 41 is contaminated, a function of the PM sensor 50 may deteriorate or even be lost.

Figure 7:
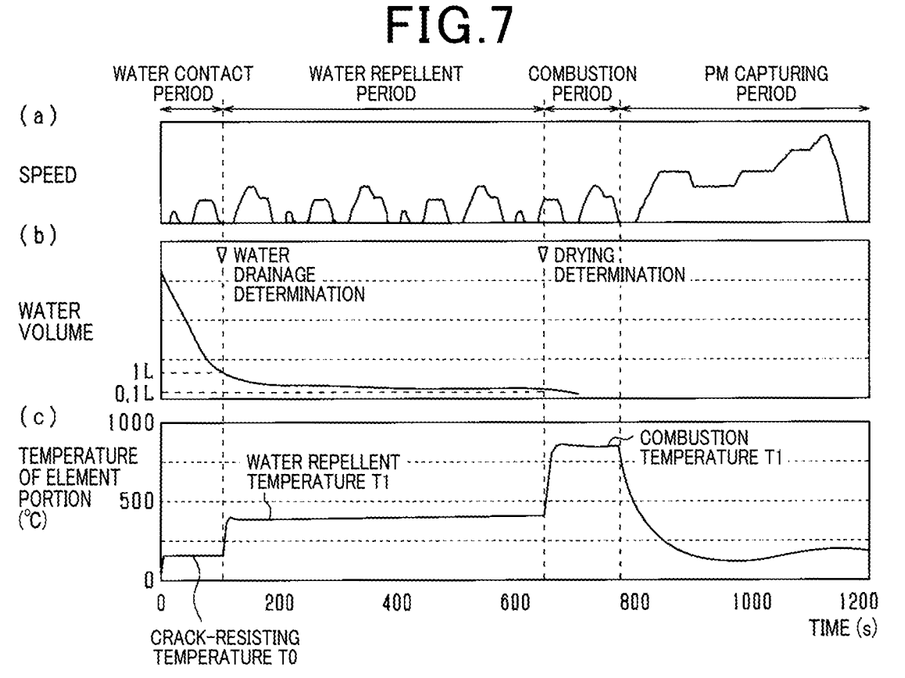
FIG. 7 is a time chart showing a vehicle speed (same figure (a)), a water volume in an exhaust passage (same figure (B)) and an element temperature (same figure (c)) according to the first embodiment.

As a measure for prevention of contamination of the element portion 41, the generation of the Leidenfrost effect is considered, as a method to repel the condensed water. Once the Leidenfrost effect occurs, a phase of water vapor is formed between a surface 41a of the element portion 41 and the condensed water, and the condensed water slips from the surface 41a without making contact with the surface 41a. As a result, by heating the element portion 41 at a water-repellent temperature T1 of the water-repellent temperature range in which the Leidenfrost effect occurs before PM is removed by combustion, contamination of the element portion 41 may be prevented and quenching of the element portion 41 due to adherence of the condensed water may also be prevented, as shown in FIG. 7.

The water-repellent temperature range is a temperature range is defined as a lower temperature than the starting temperature of PM combustion, and in which water adhered onto the element portion 41 is repelled. Specifically, the range is from 300° C. to 800° C., for example, 350° C. to 600° C.

The water-repellent temperature range in which Leidenfrost effect occurs is a relatively high temperature range. As a result, if the exhaust passage 13 is in the state of invasion of water, a volume of water droplets of the element portion 41 is large, and in this state, if the element portion 41 is heated in the water-repellent temperature range, water-induced cracking of the element portion 41 and the heating section 47 may occur. The state of the invasion of water is a state in which there is a build-up of water in the exhaust passage 13. Conditions in which the invasion of water may occur in the exhaust passage 13, is in a situation of heavy rain, for example, when water from outside flows into the exhaust passage 13, and there is a build-up of this water inside the exhaust passage 13. Additionally, in such conditions, it is considered that the temperature of the exhaust passage 13 is low and a volume of the condensed water that is generated from condensation is relatively large. It is noted that the volume of the water is the volume of water droplets which fall onto the element portion 41. Also, the volume of the water droplets of the element portion 41 and a volume of the water droplets of the sensor portion 40, which consists of the element portion 41 and the heating section 47 have a predetermined relationship.

Figure 9:
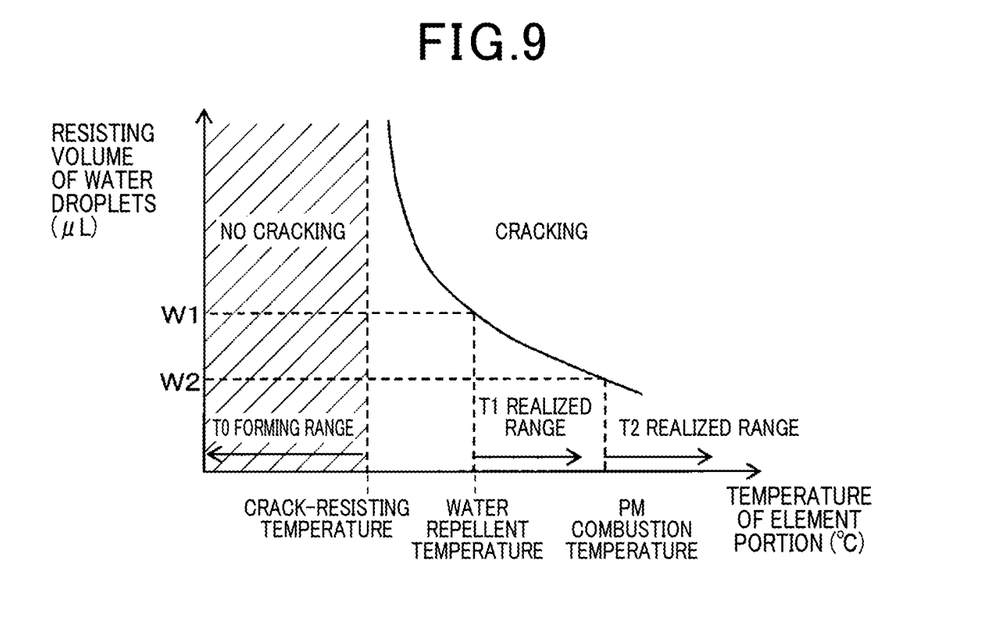
FIG. 9 is diagram showing a correspondence of an element temperature and a resistance of water droplets.

As described herein above, if water evaporates when the element portion 41 is covered with the water droplets, there is a concern that the element portion 41 will be contaminated. Therefore, if the volume of the water droplets is extremely large, the element portion 41 may be contaminated when the volume of the water droplets is decreased to the level in which the water-induced cracking of the element portion is will not occur in the water-repellent temperature range, by how the exhaust gas temperature rises. In FIG. 9, a relationship between the element temperature and a resistance volume of the water droplets are shown with a curved line. The resistance volume of water droplets is volume of which water-induced cracking will not occur (a minimum value to induce water cracking). An inner-side of the curve (lower side) specifically a point of an origin-side is a range in which water-induced cracking will not occur. In contrast, an outer-side of the curve (upper-side) is a range in which water-induced cracking will occur. There is a temperature range, indicated with hatching in FIG. 9, in which cracking of the element portion 41 is not induced independent to the volume of the water droplets of the element portion 41. Therefore, if the volume of water droplets of the element portion 41 is extremely large, it is preferable that the element portion 41 is heated at a temperature T0 which is the temperature range resisting cracking of the element portion 41, until the volume of the water droplets of the element portion 41 decreases to a certain level, as shown in FIG. 7. The temperature T0 is in the temperature range in which cracking of the element portion 41 will not occur is from 140° C. to 200° C., for example.

If the element portion 41 is in the state of the invasion of water, then the exhaust gas temperature is relatively low. As a result, the temperature of the element portion 41 may be higher than the exhaust gas temperature or near to the exhaust gas temperature, even if the element portion 41 is heated in the temperature range which resists cracking of the element portion 41. Furthermore, thermophoresis of pollutants from the element portion 41 to the exhaust gas occurs, or thermophoresis of pollutants from the exhaust gas to the element portion 41 may be suppressed. The water-induced cracking of the sensor section 40 may be thus be prevented, and contamination of the element portion 41 due to pollutants may also be suppressed. Each function of the control circuit 61 and the ECU 70 will be described in detail hereinafter.

The first estimation section 70B estimates a volume of water in the exhaust passage 13. The water concentrate which exists in the exhaust passage 13 is based a volume of the burned fuel and water contained in an intake. That is, the first estimation section 70B estimates the volume of water in the exhaust passage 13 on the basis of at least one of an operating state of the engine 20 before the engine was previously stopped, a time from when the operation of the engine 20 was previously stopped, an operating state after the engine 20 is started at the present time, a time from when the engine 20 is started at the present time, and an external temperature at the start-up time of the engine 20 at the present time. An estimated volume of water is a volume of the condensed water. By considering the state of the operation before the engine 20 was stopped, an estimated precision of the volume of condensed water in the exhaust passage immediately after the engine 20 is restarted is enhanced. Additionally, by considering the state of the operation of the engine 20 immediately after the engine 20 is restarted, the estimated precision of a present volume of condensed water is enhanced.

Figure 11:
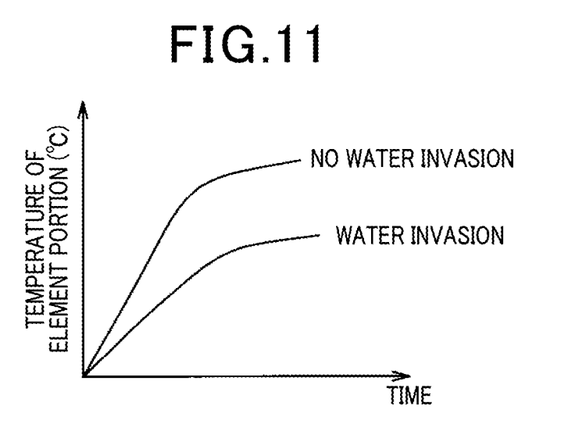
FIG. 11 is a time chart of a temperature of the element portion when invasion of water has occurred and when the invasion of water has not occurred.

The second estimation section 60A estimates the volume of water of the exhaust passage 13 on the basis of information of the PM sensor 50. Specifically, the second estimation section 60A estimates the volume of water in the exhaust passage 13 to be larger than a threshold L1 (water drainage threshold), if an elevation rate of a temperature of the element portion is lower than a predetermined rate, when the heater 44 heats the element portion 41. If, however, the temperature elevation rate is higher than the predetermined rate, the volume of water in the exhaust passage 13 is determined to be equal to or lower than the threshold L1. The threshold L1 is described in detail hereinafter. It is noted that, the predetermined rate may be a elevation rate of the temperature of the element portion 41 which is estimated from the exhaust gas temperature, the exhaust gas speed, and a charged power As shown in FIG. 11, when the exhaust passage 13 is in the state of water-invasion there are situations where the sensor portion 41 is also in a state of water-invasion. The temperature elevation rate of the sensor portion 41 is slower when the sensor portion 41 is in the state of water-invasion, compared to when the sensor portion 41 is not is the state of water-invasion, when the sensor portion 41 is heated. As a result, if the temperature elevation rate of the sensor 41 is lower than the predetermined rate, it may be estimated that the volume of water is larger than the threshold L1. That is, the invasion of water state of the sensor portion 41 may be estimated. An estimated volume of water is a total volume of water that exists in the exhaust passage 13. When water flows into the exhaust passage 13 from outside, the volume of water that flows into the exhaust passage 13 and the volume of the condensed water combined is estimated as the volume of water.

The second estimation section 60A estimates the volume of water inside the exhaust passage 13 as being larger than the threshold L1, specifically in the state of invasion of water, when a current, which flows by application of a predetermined voltage to the sensor portion 41, exceeds a predetermined current. The second estimation section 60A estimates the volume of water to be equal to or smaller than the threshold L1 when the current is less than the predetermined current. The estimated volume of water described here is also the total volume of water which exists in the exhaust passage 13.

Since water that contains impurities has conductivity, a current exceeding the predetermined current will flow when the predetermined voltage is applied, in a case of invasion of water of the element portion 41. As a result, the volume of water may be estimated to be larger than the threshold L1, when the flowing current exceeds the predetermined current. The current flows by application of the predetermined voltage to the element portion 41. It is noted that, since PM also has conductivity as described hereinabove, the current flows when the predetermined voltage is applied, even if PM is accumulated between the electrodes 41 and 42 of the element portion 41. As a result, at the previous time that the engine 20 was stopped, the amount of PM accumulated is estimated to be less than a predetermined amount of accumulated PM. If the current flow is relatively small due to the accumulation of PM, the second estimation section 60A estimates the volume of water on the basis of the current which flows to the element portion 41. It is noted that, in the present embodiment, an estimation section is configured of the first estimation section 70B and the second estimation section 60A.

The threshold L1 will now be described.

When the element portion 41 is heated in the water-repellent temperature range, the volume of water droplets which causes water-induced cracking of the element portion 41 to occur, is referred to as a volume of water droplets of water drainage. As shown in FIG. 9, a minimum value which causes water-induced cracking to occur is given as a volume of water droplets W1, when the element portion 41 is heated at the minimum value in the water-repellent heating range. The volume of water droplets W1 is the volume of water droplets of water drainage.

Figure 10:
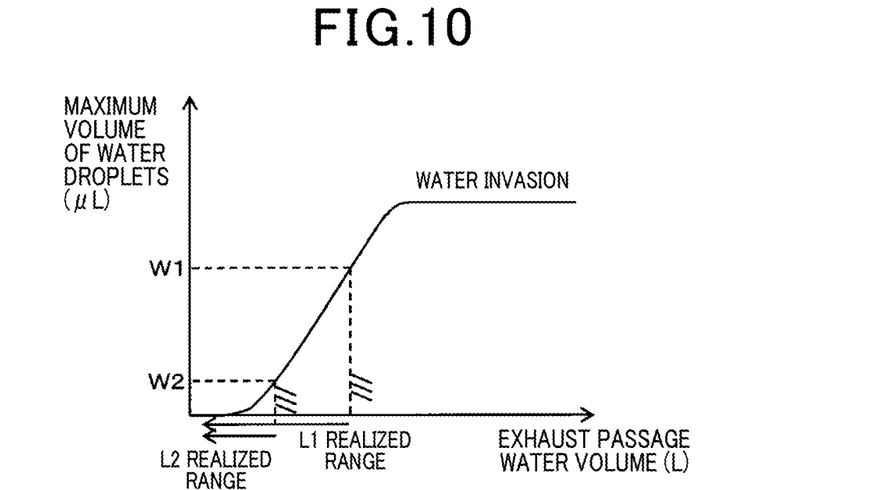
FIG. 10 is a diagram showing a correspondence of a volume of water inside the exhaust passage and a maximum volume of water droplets of the element portion.

FIG. 10 is curved line of a relation between the volume of water in the exhaust passage 13 and a maximum volume of the water droplets of the element portion 41. The maximum volume of the water droplets is a maximum value of the volume of water which falls onto the element portion 41. That is, the maximum value is maximum value of water droplets which fall onto the element portion when the vehicle suddenly accelerates in speed or suddenly stops, with a corresponding volume of water existing in the exhaust passage 13. The maximum volume of the water droplets may be calculated by conversion of the volume of water in the exhaust passage 13. As shown in FIG. 10, the threshold L1 is a value which is equal to or less than the volume of water which corresponds to a maximum volume of water droplets, when the maximum volume of water droplets is given as the volume of the water droplets W1. Specifically, the threshold L1 may be determined as only a volume of water in the exhaust passage resisting water-induced cracking of the element portion 41, even when the element portion 41 is heated in the water-repellent temperature range. The threshold L1 is 1 L (liter) for example. The 1 L is a volume when the volume of condensed water contained in the exhaust gas is relatively large. In this way, by setting the threshold L1, when the volume of water of the exhaust passage 13 is less than the threshold L1, water-induced cracking and contamination of the element portion 41 are suppressed, even when the element portion 41 is heated at the water-repellent temperature T1 of the water-repellent temperature range.

It is noted that the respective correspondence relation shown in FIG. 9 and FIG. 10 are pre-acquired in experiments, for example. In FIG. 10, saturation of the maximum volume of the water droplets, when the volume of water inside the exhaust passage 13 is larger than a certain level is due to the maximum volume of the water droplets not increasing, even when the volume of water in the exhaust passage 13 increases further. That is, when water droplets which cover an entire surface of a section of the element portion 41 which is exposed to exhaust gas by a certain amount of water, the maximum volume of water droplets will not increase even if the volume of water in the exhaust passage increases further.

The first temperature control section 60B heats the element portion 41 using the heater 44 in the temperature range in which cracking thereof will not occur, when it is determined that the estimated volume of water in the exhaust passage 13 is larger than the threshold L1. That is, the heater 44 heats the element portion 41 when it is determined that the exhaust passage 13 is in the state of the invasion of water. At this point, it is not necessary to heat the element portion 41 at a fixed temperature, that is the temperature of the element portion 41 may be changed within the temperature range such that cracking thereof will not occur. As a result, pollutants contained in the condensed water transfer from the element portion 41 to the exhaust gas by thermophoresis.

The water drainage determination section 70C determines that the water drainage of the exhaust passage 13 is completed when the water volume in the exhaust passage 13 is equal to or less the threshold L1.

A state of the completion of the water drainage is not state in which the surface of the element portion 41 is entirely covered the water droplets, but a state in which water droplets are adhered onto parts of the surface of the exhaust passage 13.

The second temperature control section 60C heats the element portion 41 in the water-repellent temperature range using the heater 44 for a predetermined period, when it is determined that the water drainage of the exhaust passage 13 is completed. The temperature of the element portion 41 may be changed within the water-repellent temperature range. The predetermined period is a period from when it is determined that the water drainage is completed until drying determination section D determines that drying of the exhaust passage 13 is completed.

The drying determination section 70D determines that drying of the exhaust passage 13 is completed when the estimated water volume is less than a threshold L2 (drying threshold).

The threshold L2 is described below. When the element portion 41 is heated in the water-repellent temperature range, the volume of the water droplets of the element portion 41 in which water-induced cracking thereof occurs is given as a volume of drying water droplets. As shown in FIG. 9, when the element portion 41 is heated at a minimum temperature of the combustion temperature range, the lower limit value of the water droplets causing water-induced cracking is given as a volume of the water droplets W2. The volume of water droplets W2 is a volume of the drying water droplets. As shown in FIG. 10, the threshold L2 is value which is equal to or less than a volume of water which corresponds to the maximum volume of water droplets, when the maximum volume of water droplets is given as the volume of the water droplet W2. That is, the threshold L2 determines that the volume of water inside the exhaust passage 13 is only a level in which water-induced cracking of the element portion 41 will not occur, even when the element portion 41 is heated in the combustion temperature range.

The threshold L2 is 0.1 L, for example. In this way, by setting the threshold L2, if the volume of water in the exhaust passage 13 is less than the threshold L2, water-induced cracking and contamination of the element portion 41 is suppressed, even when the element portion 41 is heated in the combustion temperature T2 within the combustion temperature range.

The third temperature control section 60D heats the element portion 41 in the combustion temperature range using the heater 44 for a predetermined period, when it is determined that the drying of the exhaust passage 13 is completed. The temperature of the element portion 41 may be changed within the combustion temperature range. The predetermined period is a period which is sufficient for the removal of PM which is accumulated. As shown in FIG. 7, after the accumulated PM is removed, heating by the heater 44 is stopped and the detection of PM continues until the engine 20 is stopped. It is noted that, at the start-up time of the engine 20, if the volume of water inside the exhaust passage 13 is less than the threshold L2, it is preferable that the element portion 41 is heated in the water-repellent temperature range from the start, without heating the element portion 41 in the temperature range in which cracking thereof will not occur.

Next, a procedure of detecting the quantity of PM will be described with reference to the flow chart shown in FIG. 12. In this procedure, the ECU70 and the control circuit 61 are appropriately executed in conjunction with the start-up of the engine 20.

Firstly, in FIG. 12, at step S10 the predetermined voltage is applied to the electrodes 42 and 43 of the element portion 41, and electricity is supplied to the heater 44. Next, the volume of water inside the exhaust passage 13 is estimated from each of, the operating state, for example, of the engine 20, the temperature elevation rate of the element portion 41 and the current flowing to the element portion 41. Next, at step S11, it is determined whether the estimated volume of the water is larger than the threshold L1. More specifically, at step S11, it is determined whether the estimated volume of water from at least one of the operation state, for example, of the engine 20, the temperature elevation rate of the element portion 41 and the current flowing to the element portion 41 is larger than the threshold L1. It is noted that, at step 11, if at least two or all of the estimated volumes of water are larger than the threshold L1, among the estimated three volumes of water mentioned hereinabove, the determination is preferably an affirmative determination.

At step 11, if it is determined that the estimated volume of water is larger than the threshold L1, that is, when the invasion of water is determined, then at step S12, the power supply of the heater 44 is controlled, and the element portion 41 is heated at the temperature T0 such that cracking thereof will not occur and the procedure returns to step S10. At step 11, when it is determined that the estimated volume of water is equal to or less than the threshold L1, specifically, when it is determined that the water drainage of the exhaust passage 13 is completed, next at step S13, the power supply of the heater 44 is controlled and the element portion 41 is heated in the water-repellent heating range T1.

Next, at step 14, the water volume inside of the exhaust passage 13 is estimated, and it is determined whether the estimated volume of water is less than the threshold L2, on the basis of the operating state of the engine 20 and temperature conditions, for example, which are determined by the first estimation section 70B.

At step S14, when it is determined that the estimated water volume is equal to or higher than the threshold L2, specifically, when it is determined that drying of the exhaust passage 13 is not completed, the procedure returns to step S13. On the other hand, at step S14, if it is determined that the estimated water volume is less than the threshold L2, specifically, when it is determined that drying of the exhaust passage 13 is completed, the procedure continues to step S15. At step S15, the power supply of the heater 44 is controlled, and the element portion 41 is heated at the combustion temperature T2. The PM accumulated on the element portion 41 is thus removed.

Next, at step S16, the PM adhered onto the element portion 41 is captured and the PM is detected. At step S17, the detection of PM ends with the termination of the engine 20. At step S18, when the engine 20 stops, information of the operating state and the stop time of the engine 20 is recorded in the memory of ECU70. The procedure is then finished.

The first embodiment described hereinabove, provides the following effects.

When the volume of water inside the exhaust passage 13 is larger than the threshold L1, the element portion 41 is heated in the temperature range such that cracking of the element portion 41 will not occur, and if the water volume is equal to or lower than the threshold L1 and higher than the threshold L2, the element portion 41 is heated in the water-repellent temperature range. As a result, when the element portion 41 is dried, prevention of water-induced cracking of the element portion 41 and prevention of contamination of the element portion 41 may be achieved.

When the element portion 41 is heated, if the rate of the elevating temperature of the element portion 41 is lower than the predetermined rate, it may be estimated that the volume of water inside the exhaust passage 13 is larger than the threshold L1, that is, the invasion of water state thereof may be estimated.

When the current which flows to the element portion 41, by the application of the predetermined voltage, exceeds the predetermined current, it may be estimated that the volume of water inside the exhaust passage 13 is larger than the threshold L1, that is, the invasion of water state may be estimated.

By appropriately setting the threshold L1, even if the element portion 41 is heated in the water-repellent temperature range, when it is determined that the volume of water in the exhaust passage 13 is only a volume in which the water-induced cracking of the element portion 41 will not occur, the element portion 41 is heated in the water repellent temperature range. As a result, water-induced cracking of the element portion 41 is prevented, and the contamination thereof also suppressed.

By heating of the element portion 41 in the combustion temperature range when drying of the exhaust passage 13 is completed, the prevention of water-induced cracking of the element portion 41 can be achieved with higher certainty.

By appropriately setting the threshold L2, even when the element portion 41 is heated in the combustion temperature range, when it is determined that the volume of water in the exhaust passage 13 is only a volume in which water-induced cracking of the sensor element 41 will not occur, the element portion 41 is heated in the combustion temperature range. As a result, water-induced cracking of the element portion 41 is prevented, and the contamination thereof also suppressed.

The volume of water in the exhaust passage 13 may be estimated with good precision on the basis of, the operating state thereof before the engine 20 was previously stopped, the time from when the engine was previously stopped, the operating state after the engine 20 is restarted, and the temperature conditions, for example.

A durability of the element portion 41 which accumulates PM may be enhanced, by using thermally stable and chemically stable ceramic materials, as materials for the insulation substrates 45 and 45.

Second Embodiment

Figure 13:
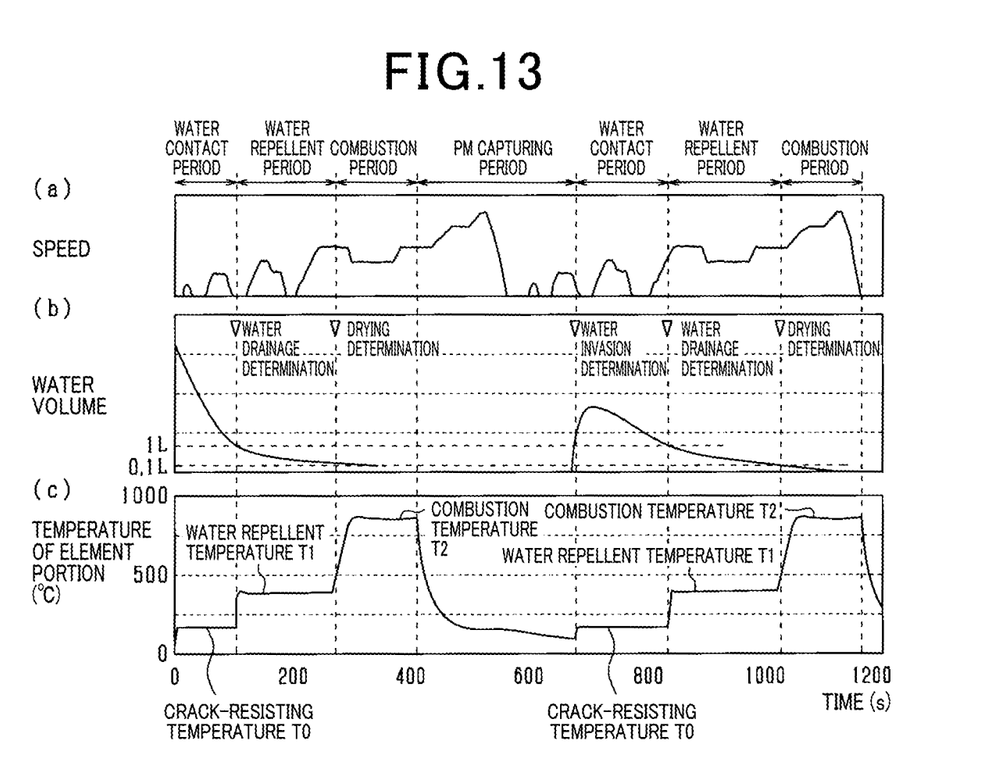
FIG. 13 is a time chart of a vehicle speed (same figure (a)) a water volume inside the exhaust passage (same figure (b)) and an element temperature (same figure (c)).

Next, parts of a second embodiment which are different from first embodiment will be described with reference to FIG. 13.

If the engine 20 is a diesel engine, an intake volume is large and the temperature of exhaust gas is low compared to a gasoline engine. For example, an exhaust gas temperature of a diesel engine rises to 400° C., compared to 800° C. for a gasoline engine. As a result, if the engine 20 is a diesel engine, the exhaust passage 13 is easily quenched when fuel is cut, and condensed water may be generated, compared to a gasoline engine. Moreover, the element portion 41 may become in the state of the invasion of water. Also, if the engine 20 is installed in a hybrid vehicle, quenching of the exhaust passage 13 and generation of condensed water may occur during idle reduction and when fuel is cut at a point of regeneration brake. In such circumstances, the element portion 41 may become in the state of invasion of water.

In a situation of heavy rain, for example, a situation of water entering into the exhaust passage 13 during the operation of the engine 20, and the element portion 41 being subjected to the state of invasion of water may occur.

At this point, in the second embodiment, during a period in which PM is captured, monitoring of whether the volume of water inside the exhaust passage is larger than the threshold L1 is constantly performed. A time chart in FIGS. 13(a), (b) and (c), shows a vehicle speed, the volume of the water inside the passage 13 and the temperature of the element portion 41 when there is a build-up of water in the exhaust passage 13 during the PM capturing period and the element portion 41 is in the state of invasion of water During a period in which PM is captured, the volume of water inside the exhaust passage 13 is larger than the threshold L1, and when it is determined that the exhaust passage 13 is in the state of water invasion, the element portion 41 is heated once again by the heater 44 at the temperature T0 in which the cracking thereof will not occur.

Thereafter, if the water volume inside the exhaust passage 13 is equal to or less than the threshold L1, it is determined that water drainage of the exhaust passage 13 is completed, and the element portion 41 is once again heated at the water-repellent temperature T1. If however, the water volume inside the exhaust passage 13 is less than the threshold L2, it is determined that drying of the exhaust passage 13 is completed, and the element portion 41 is heated once again at the combustion temperature T2, whereby the accumulated PM is removed. Thereafter, the detection of PM is restarted.

According to the second embodiment described hereinabove, in a case of the invasion of water of the exhaust passage 13 occurring during the detection period of PM, water induced cracking is suppressed, and the detection of PM may be restarted by resetting the PM sensor 50.

Other Embodiments

At step S14 the volume of water may also be estimated by the second estimation section 60A. Specifically, when the temperature elevation rate of the element portion 41 is lower than a predetermined rate, the estimated water volume is equal to or higher than the threshold L2. If the temperature elevation rate is higher than the predetermined rate, it is estimated that the volume of the water is less than the threshold L2. The predetermined rate here is a set as larger value than the predetermined rate of step S10. Additionally, when the current which flows by application of a predetermined voltage to the element portion 41 exceeds the predetermined current, it is estimated that the volume of water is equal to or higher than the threshold L2, however, if the current is less than the predetermined current it is estimated that the volume of water is lower the threshold L2. The predetermined current described here is a smaller value than the predetermined current of S10.

A function of the control circuit 61 of the SCU60 which is actualized by the ECU70 and the heater switch 62 may be combined in the ECU70. Specifically, the electrodes 42, 43 and the heater 44 are connected to the ECU70, and the PM detection apparatus 80 is configured from the PM sensor 50 and the ECU70. When the PM detection apparatus 80 is equipped with the SCU60 and the ECU70, a partial function of the control circuit 61 may be actualized by the ECU70. A partial function of the ECU70 may also be actualized by the control circuit 61. Also, the ECU70 may not perform an execution of the control of the engine 20.

An adaptable engine of the PM detection apparatus 80 is not limited to a diesel engine. That is the PM detection apparatus 80 may be adapted to engines which use gasoline, alcohol, or natural gas, for example.

SYMBOLS

20 . . . Engine
41 . . . element portion
44 . . . heater
60 . . . SCU
70 . . . ECU

What is claimed is:

1. A particulate matter detection apparatus comprising:
   an element portion onto which a particulate matter contained in an exhaust of an internal combustion engine is to be adhered;
   a heater heating the element portion;
   a detecting portion detecting a quantity of the particulate matter on a basis of electrical features of the element portion;

an estimation section estimating a volume of water in an exhaust passage of the internal combustion engine;
a first temperature controller heating the element portion using the heater to cause a temperature of the element portion to be within a temperature range using the heater, when the estimated volume of water is larger than a water drainage threshold, wherein the element portion is configured to prevent water induced cracks of the element portion independently of any volume of water droplets covering the element portion when the temperature of the element portion is within the temperature range;
a water drainage determination section which determines completion of water drainage of the exhaust passage, when the estimated volume of the water is less than the water drainage threshold; and
a second temperature controller configured to,
when it is determined that the water drainage is completed, heat the element portion using the heater, such that the temperature of the element portion is maintained within a water-repellent temperature range for a predetermined period, the water repellent temperature range being defined as a lower temperature than a starting temperature of combustion of the particulate matter and enable water adhered onto the element portion to be repelled using the heater.

2. The particulate matter detection apparatus according to claim 1, wherein the estimation section is configured to, when an elevation rate of a temperature of the element portion is lower than a predetermined rate, estimate the volume of water as being larger than the water drainage threshold, when the element portion is heated by the heater.

3. The particulate matter detection apparatus according to claim 1, wherein the estimation section is configured to, when a flowing current exceeds a predetermined current, estimate the volume of the water as being larger than the water drainage threshold, the flowing current being a current which flows by application of a predetermined voltage to the element portion.

4. The particulate matter detection apparatus according to claim 1, wherein the water drainage threshold is a value which is equal to or less than the volume of water corresponding to a maximum volume of water droplets, when the volume of water droplets of water drainage is defined as the volume of water droplets causing water-induced cracking; and
the maximum volume of the water droplets covering the element portion is converted from the volume of water, when the element portion is heated in the water-repellent temperature range.

5. The particulate matter detection apparatus according to claim 1, the apparatus further comprising;
a drying determination means configured to, when the volume of water is estimated to be smaller than a drying threshold, determine that drying of the exhaust passage is completed, the drying threshold being defined as being smaller than the water drainage threshold; and
a third temperature controller configured to, when the drying is determined to be completed; heat the element portion in a combustion temperature range using the heater, the combustion temperature range being defined as a range in which the combustion of particulate matter is enabled, wherein the predetermined period is given as a time from when the water drainage is determined to be completed, until a time when drying of the water drainage is determined to be completed.

6. The detection particulate matter apparatus according to claim 5, wherein the drying threshold is given to be equal to or lower than the volume of water corresponding to the maximum volume of the water droplets; when the volume of the water droplets covering the element portion which causes the water-induced cracking is a volume of the drying water droplets; and
the maximum volume of the water droplets covering the element portion being converted from the volume of the water is the volume of the drying water droplets, when the element portion is heated in the combustion temperature range.

7. The detection particulate matter apparatus according to claim 1, wherein the temperature range to prevent water induced cracking of the element portion is 140° C. to 200° C., independently of the any volume of the water droplets covering the element portion.

8. The detection particulate matter apparatus according to claim 1, wherein the water-repellent temperature range is 350° C. to 600° C.

9. The detection particulate matter apparatus according to claim 1, wherein the estimation section estimates the volume of water on the basis of at least one of; an operating state before previously stopping the internal combustion engine, a time from the previously stopping of an operation of the internal combustion engine, an operating state after a most recent start-up time of the internal combustion engine at, a time from the most recent start-up time of the internal combustion engine, and a temperature at the most recent start-up time of the internal combustion engine.

10. The detection particulate matter apparatus according to claim 1, wherein the element portion is configured from ceramic material.

11. The particulate matter detection apparatus according to claim 2, wherein the estimation section is configured to, when a flowing current exceeds a predetermined current, estimate the volume of the water as being larger than the water drainage threshold, the flowing current being a current which flows by application of a predetermined voltage to the element portion.

12. The particulate matter detection apparatus according to claim 2, wherein the water drainage threshold is a value which is equal to or less than the volume of water corresponding to a maximum volume of water droplets; when the volume of water droplets of water drainage is defined as the volume of water droplets causing water-induced cracking, and the maximum volume of the water droplets covering the element portion is converted from the volume of water, when the element portion is heated in the water-repellent temperature range.

13. The particulate matter detection apparatus according to claim 3, wherein the water drainage threshold is a value which is equal to or less than the volume of water corresponding to a maximum volume of water droplets; when the volume of water droplets of water drainage is defined as the volume of water droplets causing water-induced cracking, and the maximum volume of the water droplets covering the element portion is converted from the volume of water, when the element portion is heated in the water-repellent temperature range.

14. The particulate matter detection apparatus according to claim 2, the apparatus further comprising;
a drying determination means configured to, when the volume of water is estimated to be smaller than a drying threshold, determine that drying of the exhaust passage is completed, the drying threshold being defined as being smaller than the water drainage threshold; and a third temperature controller configured to, when the drying is determined to be completed, heat the element portion in a combustion temperature range using the heater, the combustion temperature range being defined as a range in which the combustion of particulate matter is enabled, wherein the predetermined period is given as a time from when the water drainage is determined to be completed, until a time when drying of the water drainage is determined to be completed.

15. The particulate matter detection apparatus according to claim 3, the apparatus further comprising;
a drying determination means configured to, when the volume of water is estimated to be smaller than a drying threshold, determine that drying of the exhaust passage is completed, the drying threshold being defined as being smaller than the water drainage threshold; and
a third temperature controller configured to, when the drying is determined to be completed, heat the element portion in a combustion temperature range using the heater, the combustion temperature range being defined as a range in which the combustion of particulate matter is enabled, wherein the predetermined period is given as a time from when the water drainage is determined to be completed, until a time when drying of the water drainage is determined to be completed.

16. The detection particulate matter apparatus according to claim 2, wherein the temperature range to prevent water induced cracking of the element portion is 140° C. to 200° C., independently of the any volume of the water droplets covering the element portion.

17. The detection particulate matter apparatus according to claim 3, wherein the temperature range to prevent water induced cracking of the element portion is 140° C. to 200° C., independently of the any volume of the water droplets covering the element portion.

18. The detection particulate matter apparatus according to claim 2, wherein the water-repellent temperature range is 350° C. to 600° C.

19. The detection particulate matter apparatus according to claim 2, wherein the estimation section estimates the volume of water on the basis of at least one of; an operating state before previously stopping the internal combustion engine, a time from the previously stopping of an operation of the internal combustion engine, an operating state after a most recent start-up time of the internal combustion engine at, a time from the most recent start-up time of the internal combustion engine, and a temperature at the most recent start-up time of the internal combustion engine.

20. The detection particulate matter apparatus according to claim 2, wherein the element portion is configured from ceramic material.

21. A particulate matter detection apparatus comprising:
a sensor configured such that particulate matter in exhaust of an internal combustion engine adheres onto the sensor;
a heater control configured to heat the sensor; and
a control system, including electrical circuitry and a computer hardware processor for executing instructions such the control system is at least configured to:
detect a quantity of the particulate matter on a basis of electrical features of the sensor;
estimate a volume of water in an exhaust passage of the internal combustion engine;
perform a first temperature control to heat the sensor using the heater to cause a temperature of the sensor to be within a temperature range using the heater, when the estimated volume of water is larger than a water drainage threshold, wherein the sensor is configured to prevent water induced cracks of the sensor independently of any volume of water droplets covering the sensor when the temperature of the sensor is within the temperature range;
perform a water drainage determination which determines completion of water drainage of the exhaust passage, when the estimated volume of the water is less than the water drainage threshold; and
perform a second temperature control to, when it is determined that the water drainage is completed, heat the sensor using the heater, such that the temperature of the sensor is maintained within a water-repellent temperature range for a predetermined period, the water repellent temperature range being defined as a lower temperature than a starting temperature of combustion of the particulate matter and enable water adhered onto the sensor to be repelled using the heater.

* * * * *